J. J. SQUIRE.

Horse-Rake.

No. 6,670.

Reissued Sept. 28, 1875.

Witnesses:
Alex Mahon
John G. Center.

Inventor:
John J. Squire
by A. M. Pritts
Attorney

N. PETERS, PHOTO-LITHOGRAPHER, WASHINGTON, D. C.

UNITED STATES PATENT OFFICE.

JOHN J. SQUIRE, OF ST. LOUIS, MISSOURI, ASSIGNOR TO ADAM R. REESE.

IMPROVEMENT IN HORSE-RAKES.

Specification forming part of Letters Patent No. 16,318, dated December 23, 1856; reissue No. 3,303, dated February 16, 1869; extended seven years; reissue No. 6,670, dated September 28, 1875; application filed April 24, 1875.

*To all whom it may concern:*

Be it known that I, JOHN J. SQUIRE, of the city of St. Louis, county of St. Louis and State of Missouri, did invent certain new and useful Improvements on Horse-Rakes to be used in gathering hay or grain, and of which the following is a full and exact description, reference being had to the accompanying drawings and the letters of reference marked thereon.

Figure 1:
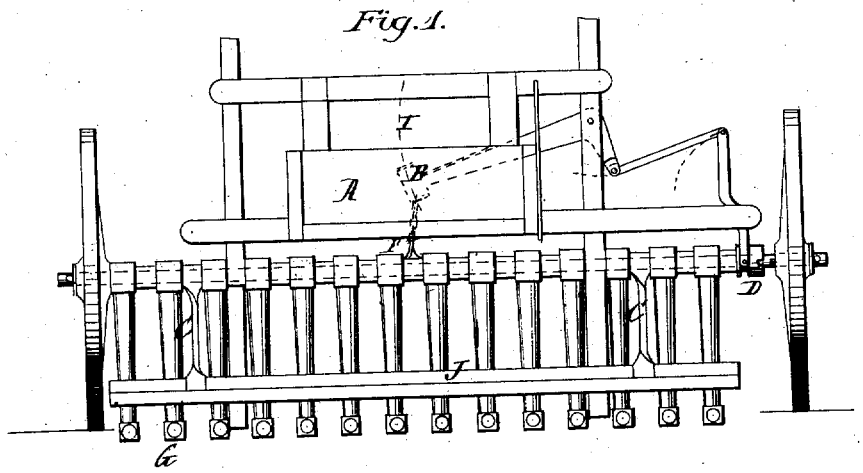
Figure 2:
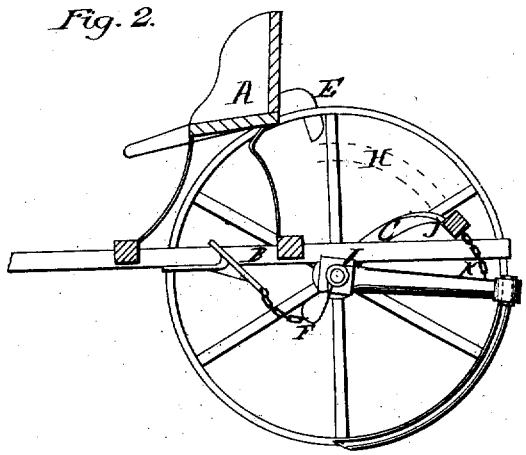
Figure 3:
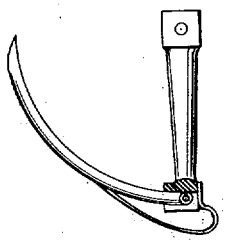

Figure 1 is a plan view of the rake. Fig. 2 is a section on the line *x x*, Fig. 1; and Fig. 3 is a side elevation of a rake tooth and arm.

The object of this invention is to combine with a two-wheel horse hay-rake, in which the rake is operated to discharge its load by the traction of the machine, a seat for the driver, and an efficient means, under the control of the driver, in said seat for enabling him to cause the discharge of the load at will, as hereinafter described.

To do this a sliding clutch, at D, Fig. 1, is placed on the axle or head that supports the rake-teeth, and adapted to be moved into engagement with a clutch or teeth on the hub or inner side of one of the wheels, as shown at D. A lever is connected to this slide, one end of said lever extending under the seat of the driver, as shown at B, Figs. 1 and 2, or in some other convenient place where the driver, in his seat, may have it under his control. An arm, F, is placed on the axle or head, and connected to the end of the lever at B by means of the chain, shown also at B. This arm is secured to the axle so as to turn with it. The arms C C are also secured to the axle or head at one end, and to the cross-bar J at the other, to which the arms G G G, &c., are suspended by a chain, shown at K. The arms G G G, &c., are swung on the axle or head at L, so as to vibrate freely, and, being suspended at the other end and kept down merely by force of gravity, they can accommodate themselves to any irregularity on the surface of the ground.

Let the rake be in the position shown on the drawing, and let it be desired to raise the arm so that the rake shall discharge its load: the driver, sitting in the seat at A, puts his foot on end of the lever B, and throws it forward in the direction of the arc I, Fig. 1, which throws the sliding clutch D in gear and causes the axle or head to turn with the wheels, so that the arms C C and their attachments are made to rise in the direction of the arc H. (Shown in dotted lines, Fig. 2.) The arms *c c* having lifted far enough in the above-mentioned direction to discharge the rake of its load, the chain on the lever F acts on the lever B and withdraws the clutch D, thus allowing the rake to fall back to its position on the ground.

If it is desired to keep the rake off from the ground, it is only necessary to catch it when it is raised up by the clutch under the hook-lever E, Fig. 2.

I am aware that it is not new to cause the rake to discharge its load automatically by the traction of the machine, devices for this purpose having been shown in the patent granted to Harvey W. Sabin, December 3, 1850, in which the devices referred to were controlled by the attendant walking behind the machine, and such invention is not, therefore, claimed broadly, and irrespective of the arrangement of the devices; but

What is claimed, and sought to be secured by Letters Patent, is—

1. In combination with a clutch mechanism adapting the rake-teeth to be raised by the traction of the machine, a lever arranged within reach of the driver in his seat on the machine, for throwing said clutch mechanism into gear.

2. In a two-wheel rake, in which the teeth are raised by the traction of the machine, a clutch mechanism, controlled by the driver in his seat on the machine, for causing the teeth to be raised, in combination with an arm on the rake-head, for automatically releasing the rake-teeth after the load has been discharged.

3. A sliding clutch on the head that supports the rake-teeth, in combination with the clutch face or pins on the carrying or driving wheel, for the purpose set forth.

JOHN J. SQUIRE.

Witnesses:

SAML. S. BOYD,

CHAS. D. MOODY.